US009484747B1

(12) United States Patent
Avritzer et al.

(10) Patent No.: US 9,484,747 B1
(45) Date of Patent: Nov. 1, 2016

(54) HOLISTIC OPTIMIZATION OF DISTRIBUTION AUTOMATION USING SURVIVABILITY MODELING

(71) Applicants: Alberto Avritzer, Mountainside, NJ (US); Sindhu Suresh, Monroe Township, NJ (US)

(72) Inventors: Alberto Avritzer, Mountainside, NJ (US); Sindhu Suresh, Monroe Township, NJ (US)

(73) Assignee: Siemens Aktiengesellschaft, Munich (DE)

( * ) Notice: Subject to any disclaimer, the term of this patent is extended or adjusted under 35 U.S.C. 154(b) by 614 days.

(21) Appl. No.: 13/941,715

(22) Filed: Jul. 15, 2013

Related U.S. Application Data

(63) Continuation-in-part of application No. 13/568,257, filed on Aug. 7, 2012, now Pat. No. 8,930,284.

(60) Provisional application No. 61/671,951, filed on Jul. 16, 2012, provisional application No. 61/590,464, filed on Jan. 25, 2012, provisional application No. 61/635,416, filed on Apr. 19, 2012.

(51) Int. Cl.
*H02J 4/00* (2006.01)
*H02J 3/00* (2006.01)
(52) U.S. Cl.
CPC ............ *H02J 4/00* (2013.01); *H02J 2003/007* (2013.01)
(58) Field of Classification Search
None
See application file for complete search history.

(56) References Cited

U.S. PATENT DOCUMENTS

2009/0319687 A1* 12/2009 Goldstein ............. G06F 9/5083
709/241
2015/0032278 A1* 1/2015 Bhageria ............. H02J 13/0017
700/295

OTHER PUBLICATIONS

Amanulla, B. et al (Jan. 24, 2012 original publication). "Reconfiguration of Power Distribution Systems Considering Reliability and Power Loss". IEEE Transactions on Power Delivery, pp. 918-926.*
Pezoa, J.E. et al. (Nov. 2009). A Scalable Distributed Algorithm for Optimizing Distribution Power-Grids. In Chilean Computer Science Society (SCCC), 2009 International Conference of the (pp. 18-24). IEEE. DOI:10.1109/SCCC.2009.9.*
Haesens, E. et al. (2005). Optimal placement and sizing of distributed generator units using genetic optimization algorithms. Electrical Power Quality and Utilisation. Journal, 11(1), 97-104.*
Chen, P. et al. (Apr. 2008). Probabilistic load flow: A review. In Electric Utility Deregulation and Restructuring and Power Technologies, 2008. DRPT 2008. Third International Conference on (pp. 1586-1591). IEEE. DOI:10.1109/DRPT.2008.4523658.*
Wishart, M.T. et al. (Jul. 2011). Intelligent distribution planning and control incorporating microgrids. In Power and Energy Society General Meeting, 2011 IEEE (pp. 1-8). IEEE. DOI:10.1109/PES.2011.6039863.*
Celli, G. et al. (2005). A multiobjective evolutionary algorithm for the sizing and siting of distributed generation. Power Systems, IEEE Transactions on, 20(2), 750-757.*

* cited by examiner

*Primary Examiner* — Stanley K Hill
*Assistant Examiner* — Benjamin Buss

(57) ABSTRACT

Transient survivability metrics are used to select improvements to distribution automation network designs. The approach combines survivability analysis and power flow analysis to assess the survivability of the distribution power grid network. Available investment decisions are then automatically optimized with respect to survivability and investment costs.

20 Claims, 9 Drawing Sheets

HOLISTIC OPTIMIZATION OF DISTRIBUTION AUTOMATION USING SURVIVABILITY MODELING

CROSS-REFERENCE TO RELATED APPLICATIONS

This application is a continuation-in-part of U.S. patent application Ser. No. 13/568,257, filed on Aug. 7, 2012, the disclosure of which is incorporated by reference herein in its entirety, which application claims priority to U.S. provisional application Ser. No. 61/590,464 filed Jan. 25, 2012 and U.S. provisional application Ser. No. 61/635,416 filed Apr. 19, 2012, the disclosures of which are incorporated by reference herein in their entireties. This application additionally claims priority to U.S. provisional application Ser. No. 61/671,951 filed Jul. 16, 2012, the disclosure of which is incorporated by reference herein in its entirety.

BACKGROUND OF THE INVENTION

1. Technical Field

The present invention relates to smart grid distribution automation networks, and more particularly, to a metric for assessing the survivability such network designs after a failure. The invention relates further to parameterizing a model for determining the metric, and using the metric for optimizing improvements to a distribution automation network.

2. Discussion of the Related Art

Distribution Automation (DA) is a feature in power distribution networks to automatically detect, isolate and restore power after failure events. SAIDI (System Average Interruption Duration Index) is a very important measure of power reliability. It is a measure of customer average impact of system interruptions as it computes the sum of customer interruption durations over the total number of customers.

Traditionally, the reliability of power systems has been quantified using average metrics, such as SAIDI. Some of the United States public service commission's use SAIDI to assess utilities' compliance with the commission rules. SAIDI was developed to track manual restoration times, and according to Standard 166-1998, the median value for North American utilities is roughly one and a half hours. In smart grid networks, power failure and restoration events will have a finer level of granularity, due to the deployment of reclosers, which isolate faulty sections, and demand side management system activities, such as distributed generators and demand response application systems. Therefore, there is a need to extend the SAIDI metric, and to develop new models and tools for the accurate computation of customer interruption indexes after power failure events occur, even if the occurrence of such events is rare. The survivability of a mission-critical application is the ability of the system to continue functioning during and after a failure or disturbance.

SUMMARY OF THE INVENTION

In an exemplary embodiment of the present invention, there is provided a method for selecting improvements to an original distributed automation power grid. The original distributed automation power grid design identifying as a current circuit. By a processor, a parameterized phased-recovery survivability model of the current circuit is created by performing a power flow analysis using a time series of load values of each of a plurality of sections in the grid at each of a plurality of times of day. An average energy not supplied metric of the current circuit is determined using the parameterized phased-recovery survivability model of the current circuit.

A candidate circuit containing a modification to the current circuit is generated. A parameterized phased-recovery survivability model of the candidate circuit is created by performing a power flow analysis using a time series of load values of each of a plurality of sections in the grid at each of a plurality of times of day. An average energy not supplied metric of the candidate circuit is determined, using the phased-recovery survivability model of the candidate circuit. Only if the average energy not supplied metric of the candidate circuit is better than the average energy not supplied metric of the current circuit, the candidate circuit is substituted as the current circuit. The operations of this paragraph are repeated until the average energy not supplied metric of the current circuit meets a survivability requirement for the grid.

The method may further comprise ceasing the repeating of the operations before the survivability requirement for the grid is met when the candidate circuit exceeds a budget for improvement costs, or when a maximum number of iterations is reached.

Creating a parameterized phased-recovery survivability model of the current circuit may further comprise computing violation matrices reflective of violations of active and reactive power requirements, wherein each element of the violation matrices indicates whether one of the plurality of sections violates power requirements at one of the plurality of times of day.

Generating a candidate circuit containing a modification to the current circuit may further comprise choosing between adding an active and a reactive power source based on a comparison of a number of active power violations with a number of reactive power violations.

Generating a candidate circuit containing a modification to the current circuit may comprise selecting a modification using a greedy algorithm designed to choose a most efficient power source having a greatest power per unit cost, or selecting a modification using a greedy algorithm designed to choose a lowest cost power source, or selecting a modification using a greedy algorithm designed to choose a most powerful power source in terms of provided power.

Generating a candidate circuit containing a modification to the current circuit further comprises selecting a modification using a steepest-ascent greedy algorithm designed to maximize improvement based on greatest provided power, lowest cost and greatest efficiency.

The operation of generating a candidate circuit containing a modification to the current circuit may include selecting equipment to add to the current circuit; and selecting one of the plurality of sections wherein to place the equipment.

In another aspect of the invention, non-transitory computer useable media are provided having computer readable instructions stored thereon for execution by a processor to perform operations as described above.

DETAILED DESCRIPTION OF EXEMPLARY EMBODIMENTS

Figure 1:
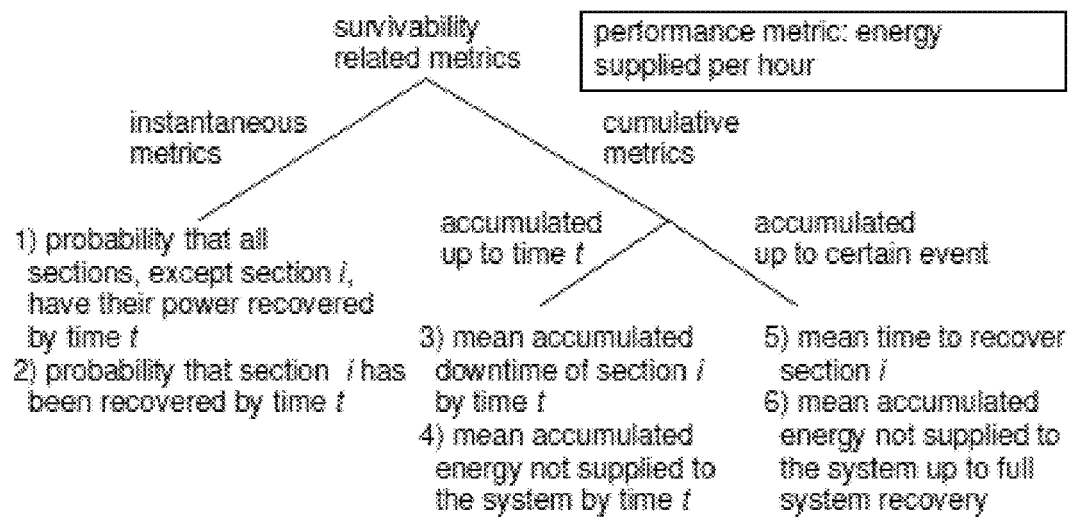
FIG. 1 is a taxonomy of survivability related metrics, according to an exemplary embodiment of the present invention.

In accordance with an exemplary embodiment of the present invention, presented herein is an analytical model to assess the survivability of distributed automation power grids. In this exemplary embodiment, a performability model is used to capture how the system recovers from a failure. The model accounts for the fact that the topology is sectionalized. Given a failure in section i, a key insight is to aggregate the sections of the network that may be fed by backup sources into a single node, denoted by i+. This aggregation allows transient metrics of the network to be efficiently quantified after a failure, also referred to as survivability metrics. For example, the model allows the computation of how the energy not supplied (ENS) after a failure varies over time as a function of available backup power, the demand response application and of the state of the information and communication network.

After a power failure event, some power grid areas of the network may experience restoration times of the order of magnitude of minutes, while other power grid areas may require hours for manual repair events to take place. The model allows for the accurate assessment of the power grid network survivability by tracking the time-dependent state of the system under study.

Some of the main contributions of this invention are the following.

Survivability model. Presented herein is a Markov chain model that supports the survivability assessment of power grid metrics accounting for the sectionalizing of distribution automation topology, the available excess power, the unreliability of the telecommunications network and the interaction with the demand response application. The model can be generated and solved in a cost-efficient manner.

Implications of system integration. The invention brings awareness to the importance of accurate holistic power engineering that considers the interactions between telecommunications reliability and the reliability benefits of integration with other distribution automation features, such as the integration of failure recovery with demand response. In particular, it is shown that if demand response can be activated after a failure occurs, the reliability of the system significantly increases.

Extension of the SAIDI metric to support distributed automation. The invention also presents an extension of the SAIDI metric that captures the dynamic nature of the smart-grid by taking into account the number of customers impacted by the service interruption, the service impact of the interruption (e.g., Energy not Supplied) and the duration of the recovery period. The analytical solution of the survivability model is used to capture the time spent in each state during the recovery period and the reward associated with each state to capture the service impact of the interruption.

Survivability metrics that can be derived from the inventive model will now be discussed.

Survivability is the ability of a system to continue to function during and after a disturbance. It has been defined by ANSI as the transient performance of a system after an undesirable event. The metrics used to quantify survivability vary according to applications, and depend on a number of factors such as the minimum level of performance necessary for the system to be considered functional, and the maximum acceptable outage duration of a system. Survivability metrics are transient metrics computed after the occurrence of a failure. In the remainder of this disclosure, time t refers to the time since a failure occurred and is measured in hours.

In an exemplary embodiment of the present invention, survivability metrics are computed with respect to a measure of interest M, also referred to as the performance metric. In the realm of power systems, an example of the performance metric M of interest could be the energy supplied per hour, measured in kilowatts. Assuming that M has value $\mu$ just before a failure occurs, the survivability behavior is quantified by attributes such as the relaxation time for the system to restore the value of M to $\mu$. In this disclosure, metrics related to the relaxation time are computed, focusing on the mean energy not supplied per hour after a failure occurs.

FIG. 1 shows the taxonomy of the survivability related metrics considered in this disclosure. Metrics are classified into two broad categories. Instantaneous metrics are transient metrics that capture the state of the system at time t. An example of an instantaneous metric is the probability that a given section i has been recovered by time t.

Cumulative metrics are obtained in the inventive model by assigning reward rates to system states. A reward is gained per time unit in a state, as determined by the reward rate assigned to that state. The accumulated reward is the result of the accumulation of rewards since the failure up to time t or up to a certain event. The mean accumulated downtime of a given section by time t and the mean accumulated energy not supplied by time t are examples of cumulative metrics computed up to time t. The mean accumulated energy not supplied up to the full recovery of the system is an example of a cumulative metric computed up to a certain event occurs. The mean time to recover a given section is also an example of the latter class of metrics, where the accumulated reward in this case is the time itself, obtained by assigning a reward of one per time unit at every state.

Now, one of the key metrics of interest in the realm of power systems, SAIDI, will be defined and extended according to an exemplary embodiment of the present invention. SAIDI is an important measure of the power utility's ability to cope with recovery from failures. It is a measure of average customer impact of system interruptions as it computes the sum of customer interruption durations over the total number of customers.

Given a topology with C sections, let N be the total number of customers and let $N_j$ be the average number of customers in the system impacted by a failure at section j, j=1, ..., C.

Let $\phi_j$ be the mean outage duration due to all failures that occur at section j, during a pre-established large observation period. The observation period is usually assumed to be one year.

Definition 1. The SAIDI index is the average outage duration for each customer served.

$$SAIDI = \sum_{j=1}^{C} \varphi_j \frac{N_j}{N} \quad (1)$$

There is a need to extend SAIDI for the smart-grid environment because in the smart-grid infrastructure the number of customers impacted by a service interruption and the energy not supplied are governed by dynamic automated processes during the recovery period.

After a failure, the energy not supplied will vary over time during a multi-step recovery process. Let $m_j(t)$ be a random variable characterizing the energy not supplied per unit time after a failure in section j, j=1, ..., C, t units of time after the failure. $m_j(t)$ accounts for the effect of one single failure in section j. Therefore, if a full system recovery occurs at time T, $m_j(t)=0$ for t≥T. Let $\overline{m}j(t)$ be the mean value of $m_j(t)$.

Let $M_j(\tau)$ be the accumulated energy not supplied by time $\tau$ after a failure in section j, j=1, ..., C, $$\overline{M}j(\tau) = \int_{t=0}^{\tau} \overline{m}j(t)dt, \, j=1,\ldots,C \quad (2)$$

Note that the total energy demanded per unit time can also vary during recovery. This occurs, for instance, if demand response is integrated with failure recovery. Let $d_j(t)$ be a random variable characterizing the total energy demanded per unit time at time t during the recovery from a failure in section j. Let $D_j(\tau)$ be the energy demanded over the first $\tau$ time units during the recovery from a failure in section j, $$\overline{D}j(\tau) = \int_{t=0}^{\tau} \overline{d}j(t)dt, \, j=1,\ldots,C \quad (3)$$

Let $\phi_j$ be the expected number of failures at section j during a pre-established large observation period (typically one year). The extended SAIDI index (ESAIDI) is defined as the outage duration accounting for the energy demanded and not supplied during the first $\tau$ units of time after a failure at a section, averaged over all sections.

Definition 2. The extended SAIDI index is given by $$ESAIDI(\tau) = \sum_{j=1}^{C} \phi_j \tau \left( \frac{\overline{M}j(\tau)}{\overline{D}j(\tau)} \right) \quad (4)$$

The inventive model used to compute survivability metrics of power distribution systems is now presented.

The methodology presented herein relies on these key principles: state space factorization, flexibility, state aggregation and initial state conditioning.

State space factorization. The methodology encompasses a set of models, where each model characterizes the system evolution after the failure of a given section. Given a topology with C sections, the methodology yields C models, where each model is tailored to the characteristics of the failed section. The advantages of such a space factorization include flexibility and reduced complexity as described below.

Flexibility: having a model tailored to a given section enables specific details to be captured about the impacts of failures on that particular section.

Figure 2:
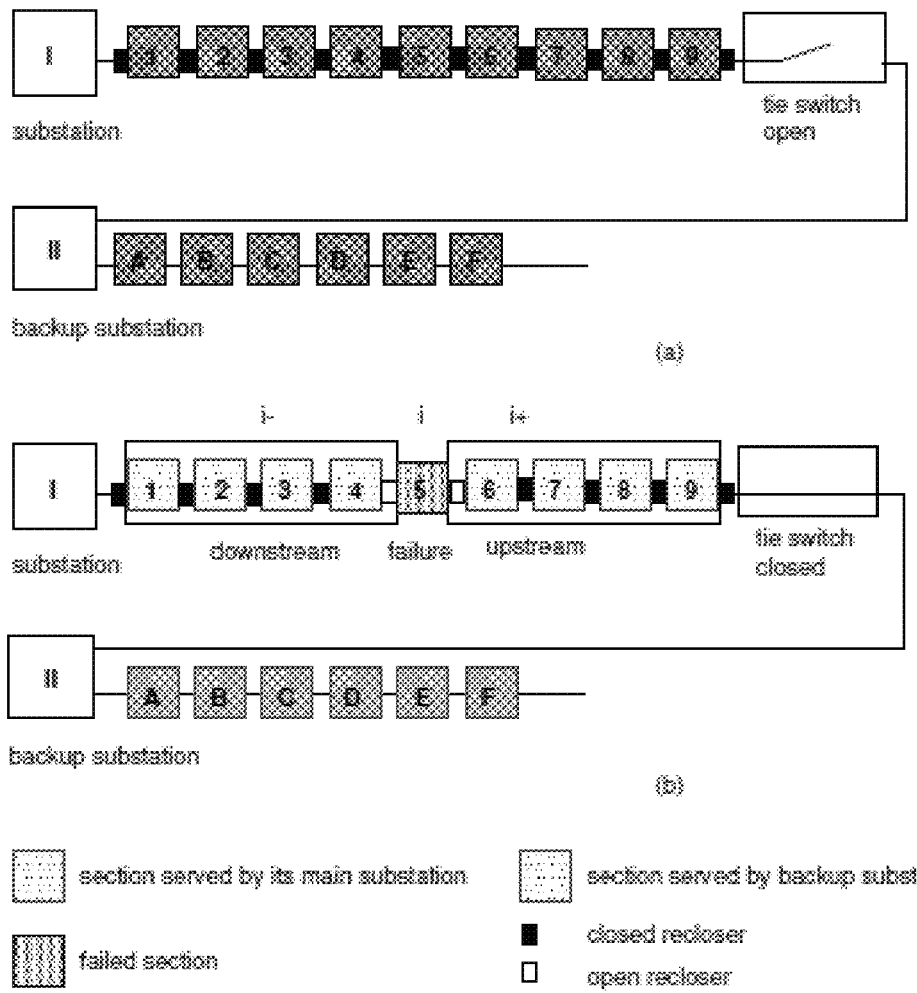
FIG. 2 illustrates a failed section and its upstream and downstream, according to an exemplary embodiment of the present invention.

State aggregation. One of the insights of this disclosure is the observation that after a failure of a given section the remaining sections of the distribution automation topology can be aggregated into groups of affected and non-affected sections. In the scenario considered in the remainder of this disclosure, as shown in FIG. 2, after the failure of section i, section i is isolated and the non-failed sections can be aggregated into two groups: the downstream sections that are aggregated into a set of sections i− and are served by their original substation and the upstream sections that are aggregated into a set of sections i+ and might be served by a backup station, if enough backup power is available. State aggregation yields significant reduction in the computational complexity required to obtain the desired metrics, since the system state space can be described in terms of the aggregated section states.

Initial state conditioning. The computations of the metrics of interest are performed by assuming that the initial state is a failure state. The inventive models do not capture the failure rates of different components. Instead, the models are parameterized by using the conditional probability that specific system components are still operational after a specific section failure. In the remainder of this disclosure, conditional probabilities will be considered to account for the probability that a substation backup power is able to supply isolated sections (q), the reliability of the telecommunications network (p) and the effectiveness of the demand response application (r).

An overview of the inventive model is now provided.

Automatic and manual restoration events are initiated after a section failure event. The restoration process is a combination of electro-mechanical and computer-based events. In what follows, the sequence of events initiated after the failure of section i is described.

The isolation of the failed section is automatically performed by reclosers, within 10-50 ms after the failure, and power is instantaneously restored to the downstream sections (i−). The upstream sections (i+) have their power restored depending on the following factors: communication, backup power and demand response.

Communication. Communication is needed for all failure detection, isolation and recovery operations. In particular, communication is used by the supervisory control and data acquisition (SCADA) system at a substation to detect failure location, recalculate flow and close the tie switch to feed the upstream sections (i+).

Backup power. Sufficient spare backup power must be available at a backup substation.

Demand response. Demand response applications can reduce the load in the system after a failure, increasing the probability that the available backup power is able to supply energy to the upstream sections.

TABLE I

Model Parameters
(rates are given in units of events/hour)

| Parameter | Description | Value |
|---|---|---|
| ∈ | Mean time for recloser to isolate failed section | ≈0 |
| α | Automatic restoration rate | 30 |
| β | Demand response rate | 4 |
| γ | Communication repair rate | 1 |
| ϑ | Manual repair rate | ¼ |

After a section failure, if the communication system is available and the backup power is able to restore energy to the upstream sections, it takes an average of 1-2 minutes to execute the automated restoration feature (see Table I). If there is not enough available backup power for the restoration of upstream sections, but communication is available, the demand response feature might be used to adjust the demand accordingly. When the demand response is effective, demand of sections i+ can be lowered to the target values within 15 minutes on average. If the communication system is not available after the section failure, a 1 hour repair time is required for manual restoration of the communication system. This time is dominated by the time it takes for a truck to arrive at the failure site.

Finally, section i may require manual repair, e.g., to remove weather related damage and restore the damaged components to their original condition. After section i is repaired, if the upstream sections are still not recovered, these sections will be connected to the main substation through section i. The average time to manually repair a section is 4 hours.

A description of the inventive model is now provided.

TABLE II

Table of Notation

| Variable | Description |
| --- | --- |
| C | Number of sections |
| i | Failed section |
| i+ | Upstream of section i (sections $\{i + 1, \ldots, C\}$) |
| i− | Downstream of section i (sections $\{1, \ldots, i - 1\}$) |
| p | Probability that communication works after failure |
| q | Probability that backup power suffices to supply isolated sections |
| r | Probability that demand response is effective after failure |

Figure 3:
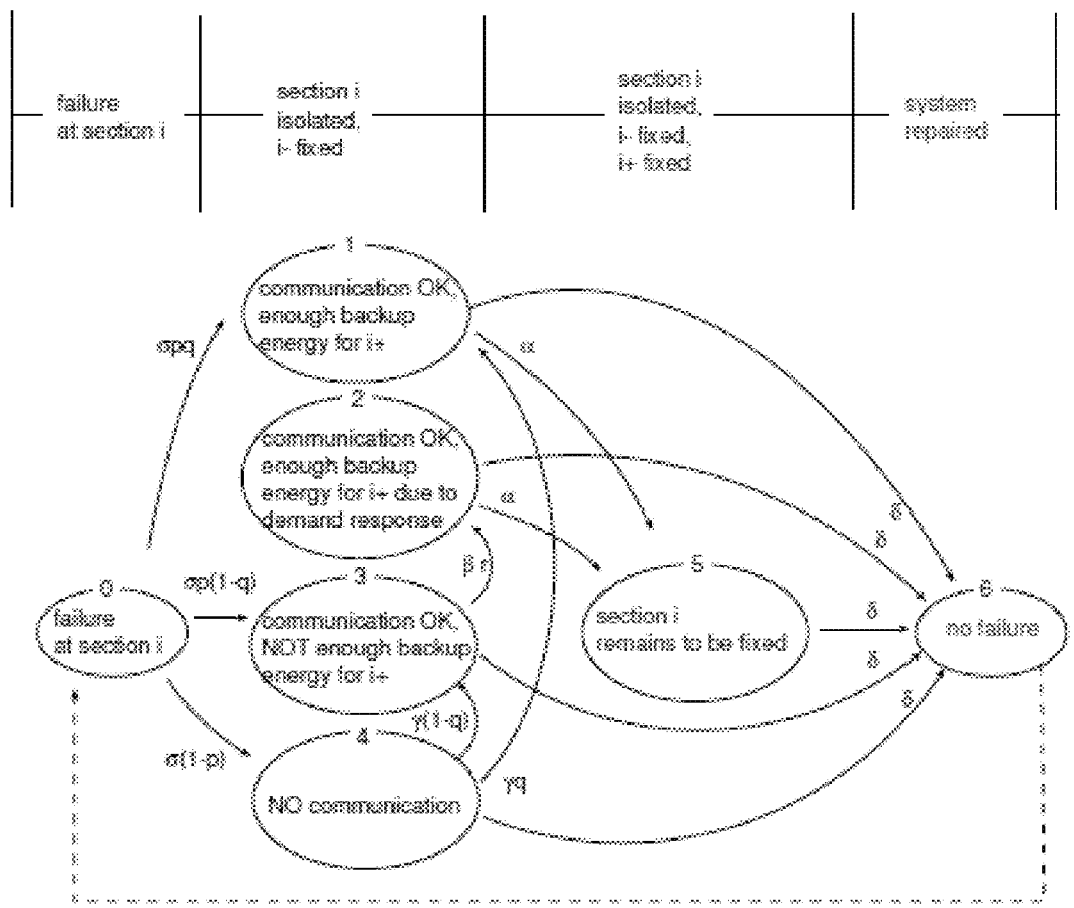
FIG. 3 illustrates a phase recovery model according to an exemplary embodiment of the present invention.

A Markov chain with rewards is used to model the phase recovery of the of the distribution automation network. The states of the model correspond to the different recovery phases at which the system might be found as shown in FIG. 3. Each state is associated with a reward rate that corresponds, for instance, to the energy not supplied per hour or the number of customers not served per hour in that state. In this disclosure, it is assumed that state residence times are exponentially distributed, which serves to illustrate the inventive methodology in a simple setting. The model may be extended to allow for general distributions for the state residence times. The system states and the state rewards are described in the following.

Phase recovery model. The phase recovery model is characterized by the following states and events.

As shown in FIG. 3, after a section failure, the model is initialized in state 0. The residence time at state 0 corresponds to the time required for the recloser to isolate the section, which takes an average of $\epsilon$. As mentioned prior, a recloser isolates a section within 10-50 ms after a failure, so in the remainder of this disclosure it is assumed $\epsilon=0$. Let p be the probability that the communication network is still operational after a section failure and q be the probability that there is sufficient backup power to supply energy for sections i+. After the isolation of section i is completed the model transitions to one of three states:

1) With probability pq the model transitions to state 1, where the distribution network is amenable to automatic restoration, 2) With probability 1−p, the model transitions to state 4, where the communication system requires manual repair, which occurs at rate $\gamma$, or 3) With probability p(1−q) the model transitions to state 3, where the effectiveness of demand response will determine if the system is amenable to automatic restoration.

At state 3, demand response takes place after a period of time with average duration $1/\beta$. Let r be the probability that demand response effectively reduces the load of the system to a level that is supported by the backup substation. In this case, the model transitions from state 3 to state 2 with rate $\beta r$. When the model is in states 1 or 2 the distribution network is amenable to automatic restoration, which occurs after a period of time with average duration $1/\alpha$. What distinguishes state 1 from state 2 is the fact that state 1 can be reached in one step transition after a failure, whereas state 2 is reached only after the successful activation of the demand response feature. Therefore, the state reward rates associated to states 1 and 2, such as the energy not supplied per hour at those states, are usually different. A manual repair of section i takes on average $1/\delta$ hours (and can occur while the system is in states 1-5). After a manual repair, the model transitions to state 6, which corresponds to a fully repaired system.

The computation of the survivability metric (Energy Not Supplied) will now be described by using the phase recovery model descried in FIG. 3. In each state of the model of FIG. 3 the energy not supplied per hour at that state is associated as the sate reward state. Let $\pi_k(t)$ be the transient probability associated with state k and $\sigma_k$ be the reward rate (e.g., mean energy not supplied per hour) associated with state k, k=0, ..., 6. Let L(t) be a random variable characterizing the reward accumulated time t after a failure (e.g., accumulated energy not supplied by time t). The mean reward accumulated by time t is $$\bar{L}(t) = \sum_{k=0}^{6} \int_{y=0}^{t} \sigma_k \pi_k(y) d_y \qquad (5)$$

Let $s_k$ be the residence time at state k before reaching state 6 (i.e., up to full system recovery), k=0, ..., 5. Let L be a random variable characterizing the accumulated energy not supplied up to full system recovery. The mean reward accumulated up to full system recovery is $$\bar{L} = \lim_{t \to \infty} \bar{L}(t) = \sum_{k=0}^{5} \sigma_k \bar{s}_k \qquad (6)$$

Note that (5) is the mean energy not supplied in the interval [0,t] after a failure, is defined in (2).

Figure 4:
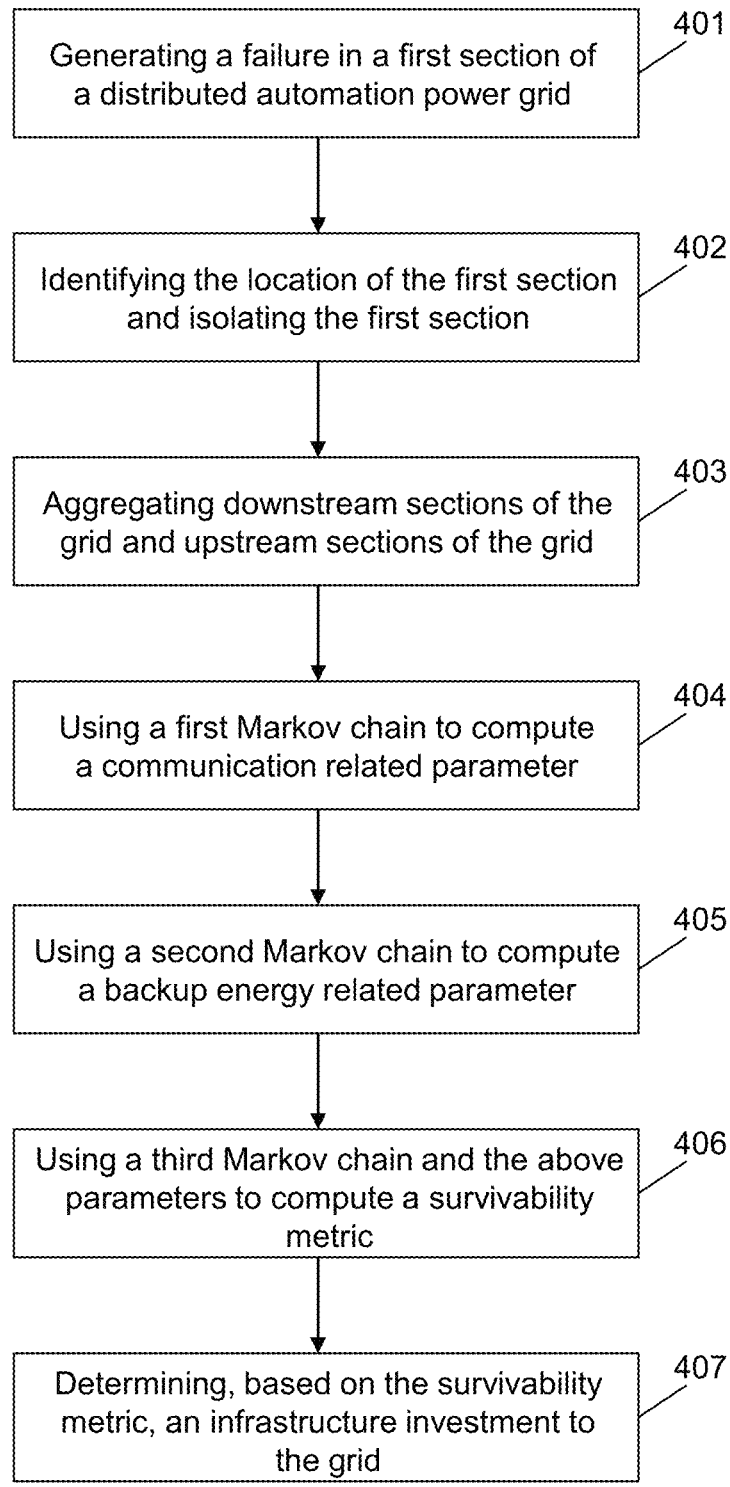
FIG. 4 is a flowchart illustrating an exemplary embodiment of the present invention.

FIG. 4 is a flowchart illustrating an exemplary embodiment of the present invention. Steps 401, 402 and 403 are related to the physical events impacting the state of the distribution automation network. As shown in FIG. 4, in step 401, a failure may be generated in a generic section i of a distributed automation power grid. As an example, section failures are usually caused by physical event (ice, down tree, summer storms, etc).

The failure may be in a generic section i in FIG. 2. In step 402, the location of the section i may be identified and isolated.

As discussed above, this process is fully automated and may occur in less than a second. In step 403, the sections of the grid that are downstream from the first section may be aggregated into a first group and the sections of the grid that are upstream from the first section may be aggregated into a second group. As shown in FIG. 2, the first group may be identified by i− and the second group may be identified by i+. This aggregation is done automatically by the electrical distribution network reclosers and takes much less than a second.

Step 404, 405, 406 and 407 are modeling steps used to compute the survivability metric.

In step 404, there is computed, using a first Markov chain, a first parameter indicating whether a communication network of the grid is operational after the failure. Communications are required to identify the failure location (section i). The first Markov chain may be referred to as a network communication failure based Markov chain for the distribution automation power grid. This Markov chain is used to compute the NetworkCommunicationIsOk parameter (first parameter) that is an input to the failure identification, isolation and restoration Markov chain (referred later to as the third Markov chain). The state of this Markov chain C is defined as the number of good paths between the distribution automation power grid and the distribution automation central controller. The transitions in this Markov chain represent communication path failures and communication path repairs. The NetworkCommunicationIsOk parameter is derived by computing the probability of C(1), i.e., the probability that at least one good network communication path exists between the distribution automation power grid and central controller.

At this time, with reference to FIG. 2, the downstream sections of the first group i− are served by substation I. The goal now is to determine if the upstream sections of the second group i+ can be served by backup substation II and, if not, how must the grid be reconfigured to provide these upstream sections with power in the event of an actual physical failure corresponding to the hypothetical one? This is accomplished by the following.

In step 405, there is computed, using a second Markov chain, a second parameter indicating whether enough backup energy exists for the second group after the failure. The second Markov chain may be referred to as a power demand Markov chain for the distribution automation power grid. This Markov chain is used to compute the AvailablePowerIsOk parameter (second parameter) that is an input to the failure identification, isolation and restoration Markov chain. The state of this Markov chain Q is defined as a difference between the available power for back-up failure restoration and the power demand in state Q. The transitions in this Markov chain represent changes in available back-up power due to initiation of additional back-up units (e.g. distributed generation or solar panels online) or due to reduced demand (e.g., activation of demand/response application, transition to off-peak configuration). The AvailablePowerIsOk parameter is derived by computing the summation of the probability of all states Q(I) for which I (the difference between available back-up power and required demand for failure restoration) is positive. Therefore, the AvailablePowerIsOk parameter is the probability that enough power exists in the back-up power supply to enable the successful execution of the automated failure restoration operation.

In step 406, there is computed, using a third Markov chain, a third parameter based on the first and second parameters, wherein the third parameter is indicative of the time required for the grid to be restored to its operating state prior to the failure. As mentioned above, the third Markov chain may be referred to as the failure identification, isolation and restoration Markov chain for the distributed automation power grid. This Markov chain is used to compute the Survivability metric. It uses as input the two parameters computed in steps 404 and 405: NetworkCommunicationIsOk and AvailablePowerIsOk. The state of this Markov chain F is defined by aggregating all the distribution automation power grid elements that have power related equivalent behavior in terms of failure isolation and restoration (section I impacted, NetworkCommunicationIsOk, AvailablePowerIsOk) and combinations of the above. The transitions in this Markov chain represent the rates at which changes in state of the failure isolation and restoration operations are performed: equivalent sections fixed or not fixed, demand response is activated, etc. The survivability parameter is computed by evaluating the time required to transition from the initial failure state to the state that represents the successful execution of the failure identification, isolation and restoration operation.

In step 407, based on the survivability metric, the power engineer may evaluate the required infrastructure investment to the distribution automation power grid network. For example, the power engineer may determine that the available back-up power in the network needs to be increased.

In this invention, introduced is a new approach for the evaluation of the likelihood of distributed automation power grid reliability survivability. In the above, we described the modeling approach to asses this metric. The approach consists of creating a power demand test suite and applying Markov modeling to the assessment of the power system survivability after the occurrence of a physical failure. The survivability test suite uses as input the list of the most likely failures and power load configurations. The output of the survivability testing phase is a metric that captures the required time for the power grid to return to correct operation after a physical failure. The distribution automation survivability metric is computed using three Markov chains, the power demand Markov chain, the network communications Markov chain, and the survivability Markov chain.

An exemplary function of this invention is to provide a tool to be used by power grid distribution automation engineers to assess the time required to recover from physical failures. Power engineers can use this tool to assess the reliability benefits of investing in the infrastructure for survivability. In addition, because the approach can be automatically executed, power engineers can also use the approach to dynamically track the survivability of their distributed automation power grids.

More specifically, by using this invention distribution automation power engineers will be able to automatically assess the investment tradeoffs involved in designing distribution automation power grids. Power engineers will be able to use the transient modeling approach to assess distribution automation power grid survivability after the occurrence of certain types of physical distribution automation failures. Power engineers will also be able to stochastically compute, using power demand based test case configurations, the survivability of power grid distribution automation systems.

The inventive method to assess the distributed automation power grid survivability condition on the occurrence of a physical failure shows superior performance because it has improved accuracy and efficiency.

As it pertains to accuracy, the test cases used for the evaluation of the survivability metric require detailed monitoring of demand and power availability. The survivability metric is computed for test cases representing the power demand defined usage and for each defined physical failure configuration. The distribution automation power grid survivability metric conditioned on the occurrence of a physical failure security shall be re-evaluated for significant changes in the available power generation sources and for significant changes in power demand.

As it pertains to efficiency, the derivation of a power demand test suite based on known power demand configurations and physical failures is an important advantage, as it allows the power engineer to focus on a significantly shorter list of likely physical failures. When new power demand types are introduced in the distribution automation power grid, the power demand test suite may be updated to account for the impact of these new demand types on the distribution automation power grid survivability.

The invention could also be generalized to automatically evaluate the required infrastructure investment to the distributed automation power grid network (as for example, increase the available back-up power), when the system survivability metric conditioned on physical distribution automation failures, (i.e., the time required for failure isolation, identification and restoration), crosses a pre-defined threshold. This generalization could require that this invention be applied to detect power demand and available power restoration capacity to detect demand response opportunities and back-up power shortages using online monitoring.

The inventive approach may be extended to incorporate reactive power into the holistic model for the assessment of large distributed automation power grids. In particular, reactive power is incorporated into the survivability Markov chain and the power demand/response Markov chain.

This extension uses the same network communication failure based Markov chain as described above, but extends the power demand Markov chain and failure identification, isolation and restoration Markov chain as follows.

Power demand Markov chain for the distribution automation power grid. This Markov chain is used to compute the AvailablePowerIsOk parameter that is an input to the failure identification, isolation and restoration Markov chain. This state of this Markov chain Q (active, reactive) is defined as difference between the available (active, reactive) power for back-up failure restoration and the (active, reactive) power demand in state Q (active, reactive). The transitions in this Markov chain represent changes in available back-up power due to initiation of additional active/reactive back-up units (e.g., distributed generation or solar panels online) or due to reduced demand (e.g., activation of demand/response application to reduce active or reactive power demand, transition to off-peak configuration). The AvailablePowerIsOk (active, reactive) parameter is derived by computing the summation of the probability of all states Q (active, reactive) (I) for which I (the difference between available active/reactive back-up power and required demand for failure restoration) is positive. Therefore, the AvailablePowerIsOk (active, reactive) parameter is the probability that enough power exists in the back-up active and reactive power supplies to enable the successful execution of the automated failure restoration operation.

Figure 5:
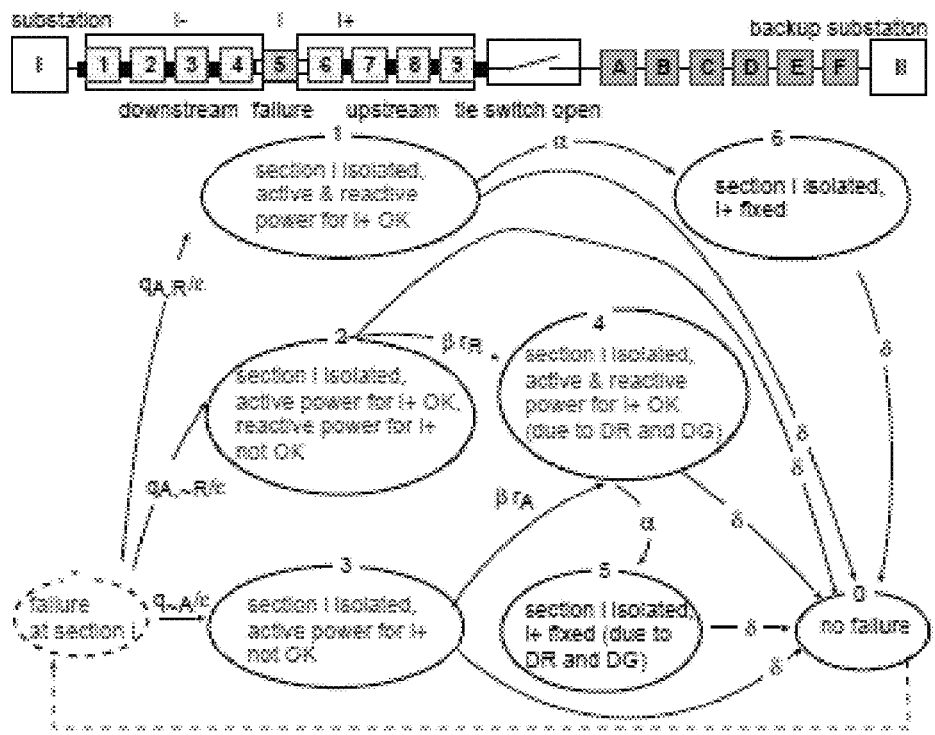
FIG. 5 illustrates a phase recovery model according to an exemplary embodiment of the present invention.

An implementation of a specific instance of the failure identification, isolation and restoration Markov chain for the distribution automation power grid is shown in FIG. 5. This Markov chain is used to compute the Survivability metric. It uses as input the two parameters computed in the network communication failure based Markov chain and the power demand Markov chain: NetworkCommunicationIsOk (p) and AvailablePowerIsOk (active, reactive): (qa, qr). The state of this Markov chain F is defined by aggregating all the distribution automation power grid elements that have power related equivalent behavior in terms of failure isolation and restoration (section I impacted, NetworkCommunicationsIsOk, AvailablePowerIsOk (active, reactive)) and combinations of the above. The transitions in this Markov chain represent the rates at which changes in state of the failure isolation and restoration operations are performed: equivalent sections fixed or not fixed, demand response is activated, etc. The survivability parameter is computed by evaluating the time required to transition from the initial failure state to the state that represents the successful execution of the failure identification, isolation and restoration operation. Other parameters used to specify the Markov chain are rates of transitions between states when repairs are possible: automated repair (alpha), demand response activated successfully (beta), manual repair (delta), high rate of transition from failure state (sigma).

FIG. 5 will now be described in detail.

After a failure at section i, power might become unavailable in other sections of the system due to cascading effects. The set of additional sections affected by a failure at section i are referred to as the upstream of i, or i+. A tie switch is used to control the flow of energy from a backup substation to i+.

Both electro-mechanical and computer-based strategies are used to address failures in an integrated manner. It takes an average of $\epsilon$ units of time for the failed section to be isolated. As the time for a section to be isolated is negligible, $\epsilon=0$.

After section i is isolated, the system transitions to states $S_1$, $S_2$ or $S_3$, depending on whether there is enough active and reactive power available to supply the upstream sections. If there is enough energy to supply i+ (state $S_1$), a tie switch is closed, energy is automatically restored, and the system transitions to state $S_6$ at rate $\alpha$. Otherwise (states $S_2$ and $S_3$), the demand response and distributed generation programs are activated, and it takes on average $1/\beta$ for them to take place. Such programs are effective with probability $r_R$ and $r_A$ at states $S_2$ and $S_3$, respectively. In case they are effective, a tie switch is closed and the system transitions from state $S_2$ and $S_3$, respectively, to state $S_4$. In state $S_4$, the upstream sections can be automatically restored. As in state $S_1$, the automatic restoration rate at state $S_4$ is $\alpha$. At states $S_5$ and $S_6$, only section i remains to be fixed. The manual repair rate occurs at rate $\delta$. A manual repair can take place from every state of the model, and yields a transition to state $s_0$ (full system recovery).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
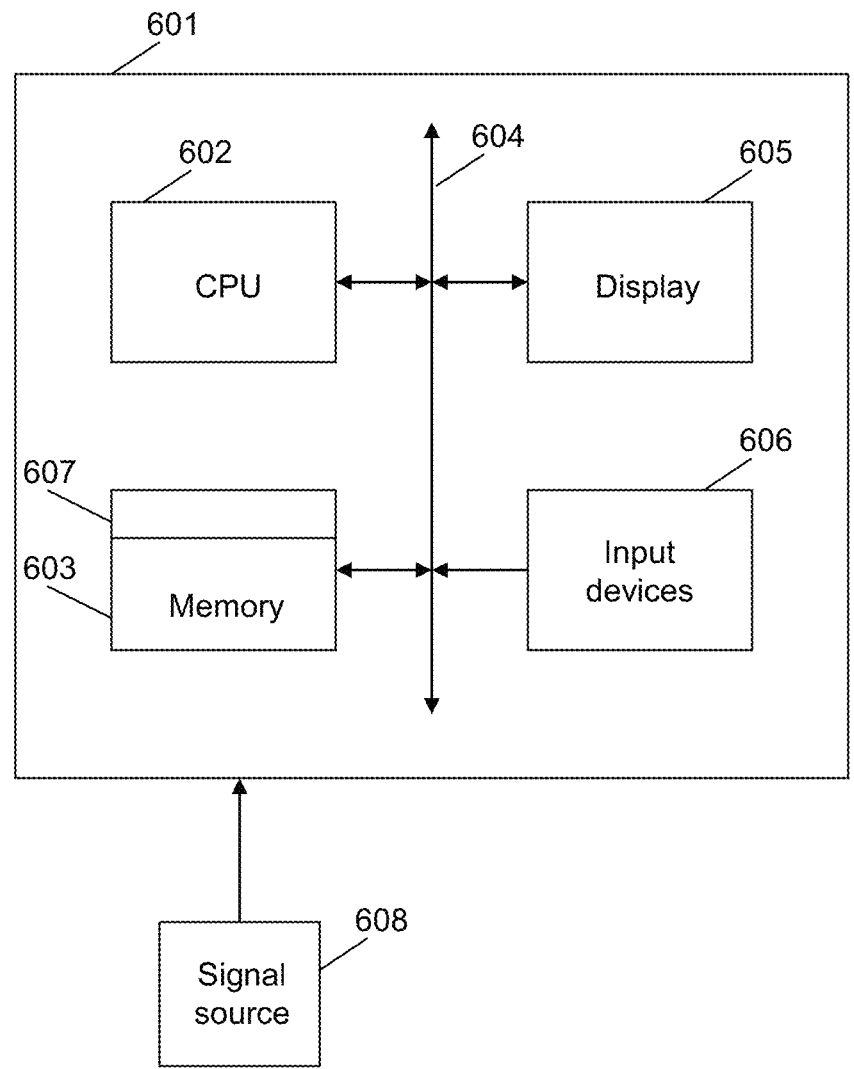
FIG. 6 illustrates a computer system in which an exemplary embodiment of the present invention may be implemented.

Referring now to FIG. 6, according to an exemplary embodiment of the present invention, a computer system 601 can comprise, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include RAM, ROM, disk drive, tape drive, etc., or a combination thereof. Exemplary embodiments of present invention may be implemented as a routine 607 stored in memory 603 (e.g., a non-transitory computer-readable storage medium) and executed by the CPU 602 to process the signal from a signal source 608. As such, the computer system 601 is a general-purpose computer system that becomes a specific purpose computer system when executing the routine 607 of the present invention.

The computer system 601 also includes an operating system and micro-instruction code. The various processes and functions described herein may either be part of the micro-instruction code or part of the application program (or a combination thereof) which is executed via the operating system. In addition, various other peripheral devices may be connected to the computer system 601 such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

1. INTRODUCTION

Design of Distribution Automation Networks Using the Survivability Model and Power Flow Equations Presented below is an analytical model based optimization approach to assess the survivability of distributed automation power grids. A simplified AC power flow model is used to analyze the AC power characteristics of the distribution automation circuit. The output of the power flow model (voltage ranges at each line of the circuit) is used to parameterize the performability model. The performability model is used for the computation of the distribution automation power grid survivability metric. The survivability metric under study herein is the average energy not supplied (AENS) after a failure event until full system recovery.

The performability model accounts for the fact that the topology is sectionalized. Given a failure in section i, a key insight of the analytical model is to aggregate the sections of the network that are fed by backup sources into a single upstream node, denoted by i+. This aggregation allows the model to efficiently quantify transient metrics of the network after a failure, also referred to as survivability metrics. For example, the model allows computation of how the AENS after a failure varies over time as a function of the available backup power, the demand response application, and the state of the cyber-physical infrastructure. After a power failure event, some power grid areas of the network may experience restoration times of an order of magnitude of minutes, while other areas may require hours for the manual repair events to take place. The model allows for the accurate assessment of the power grid survivability by tracking the time-dependent state of the system under study.

The electrical stability of the distribution automation network that results from the automated topology reconfiguration after a section failure event is an important factor in assessing the required time for failure restoration. A power flow based optimization approach is therefore presently proposed for use in planning distributed automated networks. Active and reactive power demands are identified after a power failure with a worst-case physical location of the failure, and the cost/benefit tradeoffs of active and reactive distribution power generation investment are investigated. The investment costs were obtained from government research studies in sustainable distributed power generation.

This work is based on previous work on survivability assessment of smart grids. One such work is E A. Avritzer, S. Suresh, D. S. Menasché, R. M. M. Leão, E. de Souza e Silva, M. C. Diniz, K. Trivedi, L. Happe, and A. Koziolek, "Survivability models for the assessment of smart grid distribution automation network designs," in Proceedings of the fourth ACM/SPEC International Conference on Performance Engineering (ICPE 2013), ser. ICPE '13. New York, N.Y., USA: ACM, 2013, pp. 241-252, the disclosure of which is hereby incorporated by reference in its entirety. In that paper, an analytical model is presented to assess the survivability of distributed automation power grids. The model yields closed form expressions to extensions of classical power reliability metrics such as SAIDI (System Average Interruption Duration Index). That approach has been generalized herein to evaluate the impact of available active and reactive power supply after a section failure.

This disclosure includes explanatory materials from the following paper: Anne Koziolek, Alberto Avritzer, Sindhu Suresh, Daniel Sadoc Menache, Kishor Trivedi, Lucia Happe, "Design of Distribution Automation Networks using Survivability Modeling and Power Flow Equations," submitted for publication IEEE ISSRE 2013, November 2013, Pasadena Calif.

One focus of the disclosure below is on the combination of power flow analysis and survivability modeling to achieve an optimal design of the distribution automation grid. The optimization is based on the survivability metric introduced above. Specifically, the transient solution of the distribution automation phased recovery Markov chain is used to derive the objective function and the selection of type and location of active and reactive distribution generation equipment are the improvement actions.

The following disclosure includes discussions of:

Use of power flow algorithms for the parameterization of the survivability model: The parameterization of the survivability model based on the results obtained from the power flow analysis is described.

Algorithms used to explore opportunities for survivability improvement: A transient survivability metric that is efficiently computable is used to create better distribution automation grid designs.

Application to real circuits: a case study shows the application of the proposed approach to a real power circuit.

II. DESIGN METHODOLOGY

A. System Overview

At the distribution level, the power grid includes of a set of substations, distributed side generation (e.g., wind power, solar), load management (e.g., demand response) and equipment associated with power distribution (e.g., lines, tap-changing transformers, capacitor banks, etc). Stability conditions are guaranteed by design, as far as all parts of the circuit are working properly and demand remains under pre-established bounds. Demand, however, may go beyond bounds for several reasons, such as in situations of emergency, where demand might exhibit unusual patterns. In critical situations, sections of the power grid are also more prone to failures, and backup substations might be used to supply energy to disrupted sections. Failures might occur due to several factors, such as equipment failure, incorrect load management, intentional attacks, or weather conditions (e.g., recent disruptions due to hurricane Sandy in the US). The present disclosure focuses on the latter. Note that physical failures due to weather conditions occur independently of the electrical load.

B. Engineering Approach

The engineering approach proposed herein aims at jointly (1) increasing survivability by reducing recovery time and thus reducing energy not delivered after a failure event and (2) decreasing costs to reflect budget constraints. The solutions found by this optimization approach suggest procuring new equipment such as distributed generators or capacitors or investing in demand-response infrastructure. The recovery of the system after a failure involves manual and automated initiatives. Depending on the amount of backup energy available, and on the level of automation deployed in the system, the mean energy not supplied up to a full system recovery and the mean time to recovery might vary. The proposed optimization approach therefore accounts for failures when issuing recommendations about investments.

C. Model Overview

An overview is now presented of the disclosed methodology to optimize investments on the power grid accounting for survivability. The methodology begins with an existing power grid circuit. The strategy includes the following:

1) Components are incrementally added to improve the system survivability metrics.

2) Certain sections of the system are conditioned to be in a failure state. In the present disclosure, a contingency case scenario is considered with a worst-case physical location of the failure, wherein the section that fails is the one closest to the main substation; i.e., the one that maximizes network disruption.

3) Power flow analysis is done for the modified system with failures. The power flow algorithms receive as input the power circuit topology after the failure, the generation and the demand, and yield as output the voltage and the angle at each of the circuit buses.

4) The output of the power flow is used to parameterize and solve the survivability model, which yields the AENS metric.

Demand varies over the day, and across days, for various reasons. In the described methodology, daily variations of demand are accounted for by running the power flow algorithms for different values of demand. Then, the fraction of points at which the circuit is stable given that a failure occurred is obtained from the power flow algorithms. That fraction of points at which the circuit is stable is referred to as the probability that backup power suffices to supply the upstream sections i+. That is one of the key parameters of the proposed survivability model, and depends on the circuit topology and on the availability of backup power and distributed generation, among other factors. The survivability model yields the mean energy not supplied up to full system recovery, and the mean time to recovery.

These power flow and survivability evaluations can then be used in a heuristic optimization approach as follows:

1) Define the distribution automation survivability metric required level for a given observation period as: the time required for the power grid distribution automation system to satisfy the defined power grid performance requirements specifications after the occurrence of a physical failure impacting active and reactive power generation. The transient solution of the survivability model is used for the evaluation of the distribution automation survivability metric. This metric could be defined as an instantaneous metric (e.g. probability that all sections have their power recovered by time t) or an accumulated metric (e.g. mean accumulated energy not supplied by time t).

2) Define maximum investment (in Dollars) available for the upgrade of the distribution automation network to achieve the required level of survivability defined in STEP 1.

3) Identify types and costs of reactive power compensation resources (static, dynamic), distribution generation, demand/response. In this STEP the types and costs (in Dollars) of the resources that can be used to upgrade the distributed network survivability are listed.

4) For a given distribution automation topology, solve the power flow equations for every possible topology resulting from a point of failure at the primary (i) and connection of the disconnected sections (i+) to the back-up substation through a tie switch. In this STEP a set of known electrical engineering recursive equations will be used to verify convergence. If a given topology recursive system of equations converges, it is called stable. If it does not converge, it is called unstable.

5) Identify the stable and unstable topologies in STEP 4 and the reason and place of instability (lack of active power, lack of reactive power) and the potential solutions in cost order (static reactive compensation, dynamic reactive compensation, distributed generation, distributed storage, demand/response). For each topology derived by a node failure, say section i, the reason for instability is identified by i.

6) The potential solution for instability is identified by following the methodology below:
   a) The distributed automation topology with no failures and the tie switch open is stable by design.
   b) Identify the (zero or more) topologies generated after a single point of failure at section I and by closing the tie switch that are stable.
   c) Identify the (zero or more) topologies generated after a single point of failure at section i and by closing the tie switch that are unstable.
   d) Compute the additional active and reactive loads offered to the back-up distributed topology by the single point of failure at section I by comparing the stable and unstable topologies.
   e) Identify potential solutions and costs for all the unstable topologies. Select as optimization criteria the lowest cost solution that will provide the additional active and reactive loads required for the identified unstable topologies in STEP c above. Add those resources to the first unstable topology where the place of the single point of failure is closest to the tie switch.

7) Compute the survivability metric for the distributed automation topology using the survivability model and the power flow results of STEP 4. If survivability level satisfies the objective, then STOP.

8) If available investment exhausted, then STOP optimization.

9) Upgrade the distribution network topology by adding resources of the identified type to one of the identified points of instability in STEP 5 that satisfy the optimization algorithm criteria of STEP 6 using available investment resources.

10) Repeat this sequence starting in STEP 4 with the new topology per STEP 9.

Figure 7:
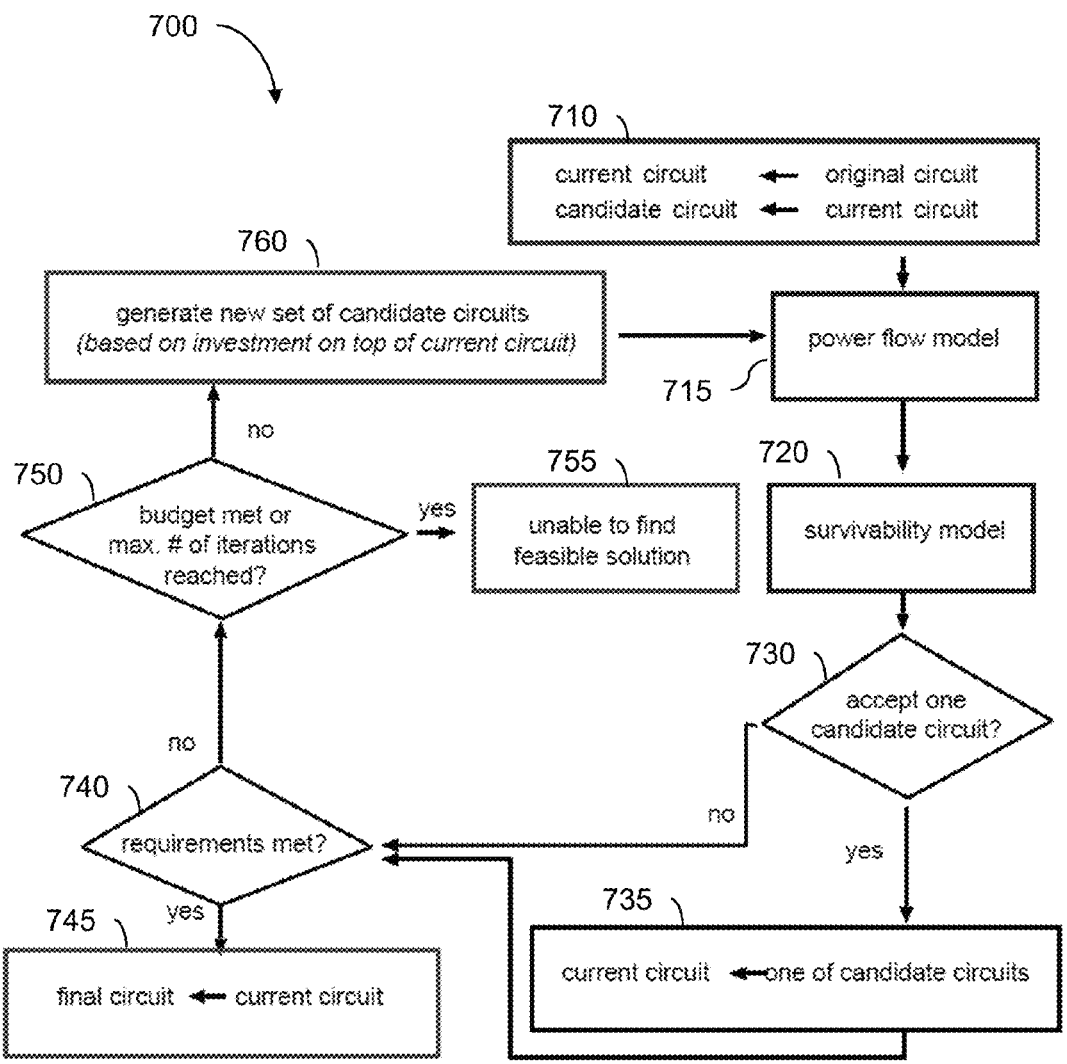
FIG. 7 is a flow chart illustrating a method in accordance with one embodiment of the invention.

An example flow chart 700, shown in FIG. 7, illustrates this approach. The approach begins by assigning the original circuit as the candidate circuit (block 710). Power flow analysis 715 and survivability analysis 720 are used to determine the AENS metric. If the candidate circuit has better AENS than the previous current candidate (decision block 730), it is accepted as the new current circuit (block 735).

Additionally, the resulting values are compared against the survivability requirements (decision block 740) and/or against cost budgets (decision block 750). If the requirements are met, the algorithm terminates at block 745, assigning the current circuit as the final circuit. If the budget is spent, or a predefined number of iterations is reached, the algorithm terminates at block 755. Otherwise, more investments can be chosen generating a new set of candidate circuits 760, and the next iteration starts.

For generating new candidate circuits, one needs to decide (1) where (i.e., in which section) to invest and (2) how (i.e., in which equipment) to invest. To answer those questions, heuristics are adopted, which make use of the outputs of the power flow and survivability algorithms. The heuristics are briefly described below.

III. BACKGROUND ON DISTRIBUTION GRIDS

In this section, some background is introduced on distribution automation systems, focusing on the aspects relevant to the model, namely (A) active and reactive power, (B) fault detection, isolation and restoration, (C) power systems stability and power flow analysis, and (D) active and reactive power investment alternatives.

A. Active and Reactive Power

In an AC circuit, active power is the power consumed by the physical work performed, such as heat generated in a resistive load, and reactive power is the power that circulates between inductive and capacitive elements as a consequence of the interaction between their magnetic and electric fields. Reactive power flows over lines and transformers and is one of the quantities of interest to system planners of distribution power grids because voltage levels are determined mostly by the reactive power that can be injected at a node. In addition, the lack of proper reactive power compensation increases the value of the electrical current required for correct system operation and the associated losses in the distribution system.

B. Fault Detection, Isolation and Restoration

Today's modern power grids are able to detect and isolate faults and automatically recover part of the grid. Feeder reclosers determine the fault boundary and isolate a faulty feeder section. Then, if backup power can be provided from other sources, power to the non-faulty feeder sections can be restored.

The granularity of fault detection, isolation and restoration depends on the type of recloser used for dividing the feeder line into sections, and the availability of active and reactive backup power to feed the healthy sections of the feeder line.

Figure 8:
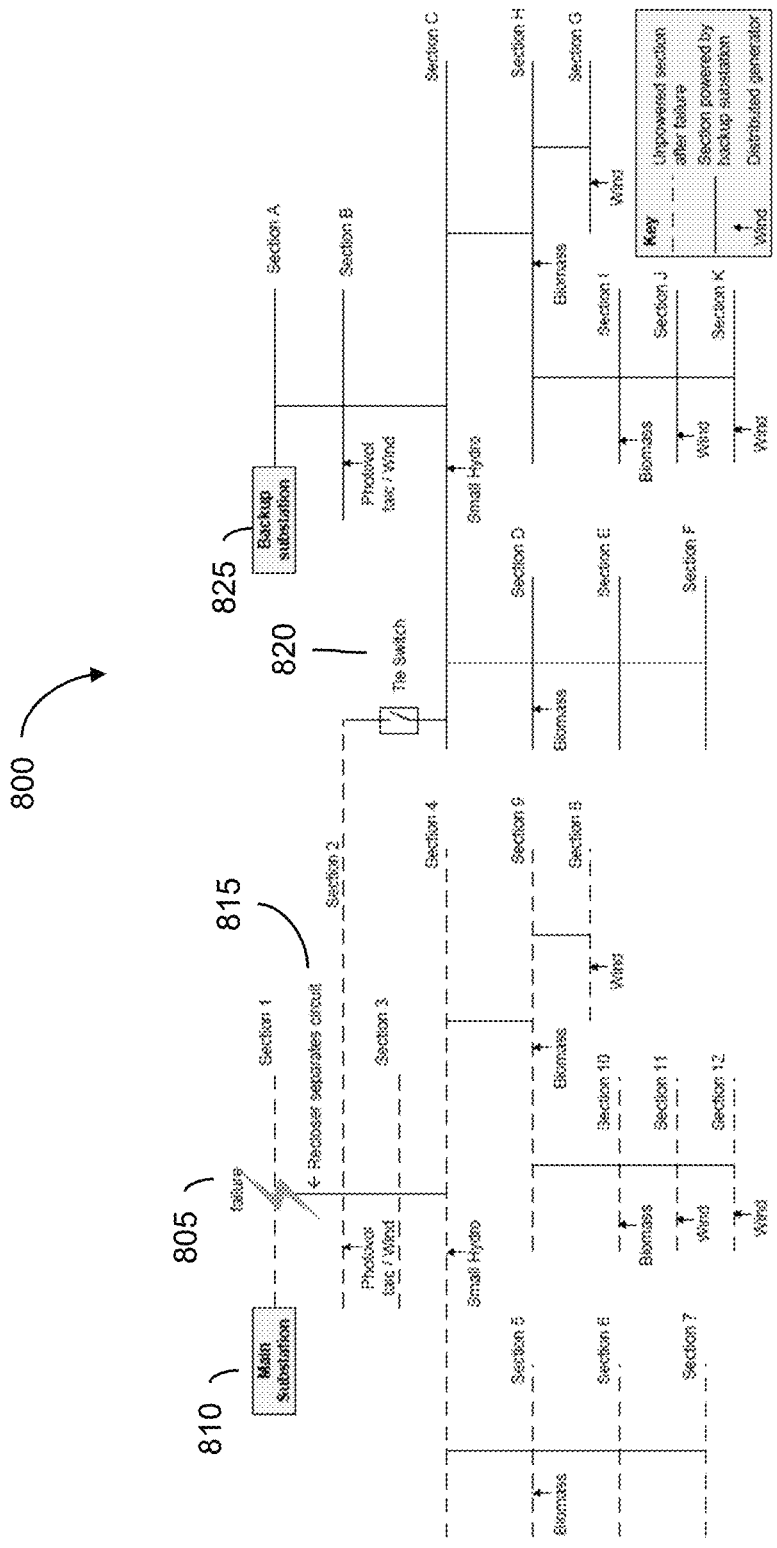
FIG. 8 is a schematic diagram of a circuit used in a case study described herein.

A case study 800 of a circuit after a failure 805 close to the main substation 810 is shown in FIG. 8. The recloser 815 isolates the faulty section 1. If enough backup power is available, the tie switch 820 can be closed to restore power to sections 2-12.

C. Power Flow Analysis

Power flow analysis is used by all utilities/power providers for the planning and operation of an electric power supplying network. The flow of active and reactive power from one node of the system to the other node through different network buses and branches is known as power flow.

Power flow analysis is carried out for the base system initially and also for different scenarios including failure scenarios such as line loss or other contingencies like losing a generator. This analysis is used mainly for the steady state performance of the network.

Power flow studies provide a mathematical approach for determination of various bus (nodes) active and reactive power, voltages, and the phase angles between the voltages among different network nodes under steady state condition. This analysis is carried out based on system constraints/limits imposed on each bus based on standards and regulations. In the following, a radial circuit is analyzed using recursion for power flow analysis of such circuits with distribution side power management.

Conducting the studies helps planners have an understanding not only about the steady state performance of the system but also about the performance matrices of the network after fault detection and isolation. These matrices are governed by the standards set forth by regulatory authorities, mostly on the voltage at the point of coupling/bus, and the angle of deviation between the buses for transfer of power within limits. According to European regulations for the distribution side, the voltage must be within a limit of 10%. Voltage stability of a system depends on the available reactive power, whereas angle stability depends on available active power. The introduction of the demand response feature provides an alternative to help reduce the stress on the system.

D. Reactive Power Margin and Cost Matrix

Network planning is carried out by considering several options to deal with failure events. The loss of a substation and the switching of the load to a backup substation with limited reactive power margin can create voltage instability, if not enough reactive power generation is available at the backup substation. The first line of defense against voltage instability is to provide reactive power compensation by using shunt and series capacitors along with load tap changing transformers.

There is a need to create detailed models for the assessment of the distribution side because of the large number of options and scenarios. For example, distributed energy resources can act as active/reactive power sources, thereby relaxing the stress and increasing the reactive stability margin. Furthermore, in smart grids, consumers can be asked to reduce their load by issuing price signals or by sending commands to devices (demand response).

The present disclosure considers different active/reactive power generation options and required capital investments. The considered options 1-4 presented in Table AI were derived mostly from the data reported in the U.S. Government EPA Renewable Energy Cost Database. The data for reactive power pricing (option 6) and the data for demand response pricing (option 5) were derived from other sources. The costs (in USD) obtained for Biomass and Solar reflected economies of scale; i.e., larger generators generate more power per invested USD than smaller generators. In contrast, Small Hydro costs were constant at 2402 $/kW, DStatcom costs were 55 $/kVAr and Demand Response costs were 165 $/kW of demand that was controlled by the demand response feature.

TABLE AI

COST MATRIX FOR ACTIVE REACTIVE POWER INVESTMENT

| option type | | active power supply | reactive power supply | total investment cost in $ |
|---|---|---|---|---|
| 1 | Biomass | Yes | Yes | 10000 - 3000000 |
| 2 | Wind | Yes | Yes | 4000 - 2000000 |
| 3 | Solar | Yes | Yes | 2600 - 800000 |
| 4 | Small Hydro | Yes | Yes | 4804 - 2402000 |
| 5 | Demand Response | Yes | Yes | 330 - 165000 |
| 6 | DStatcom | No | Yes | 110 - 55000 |

IV. SURVIVABILITY MODEL

Figure 9:
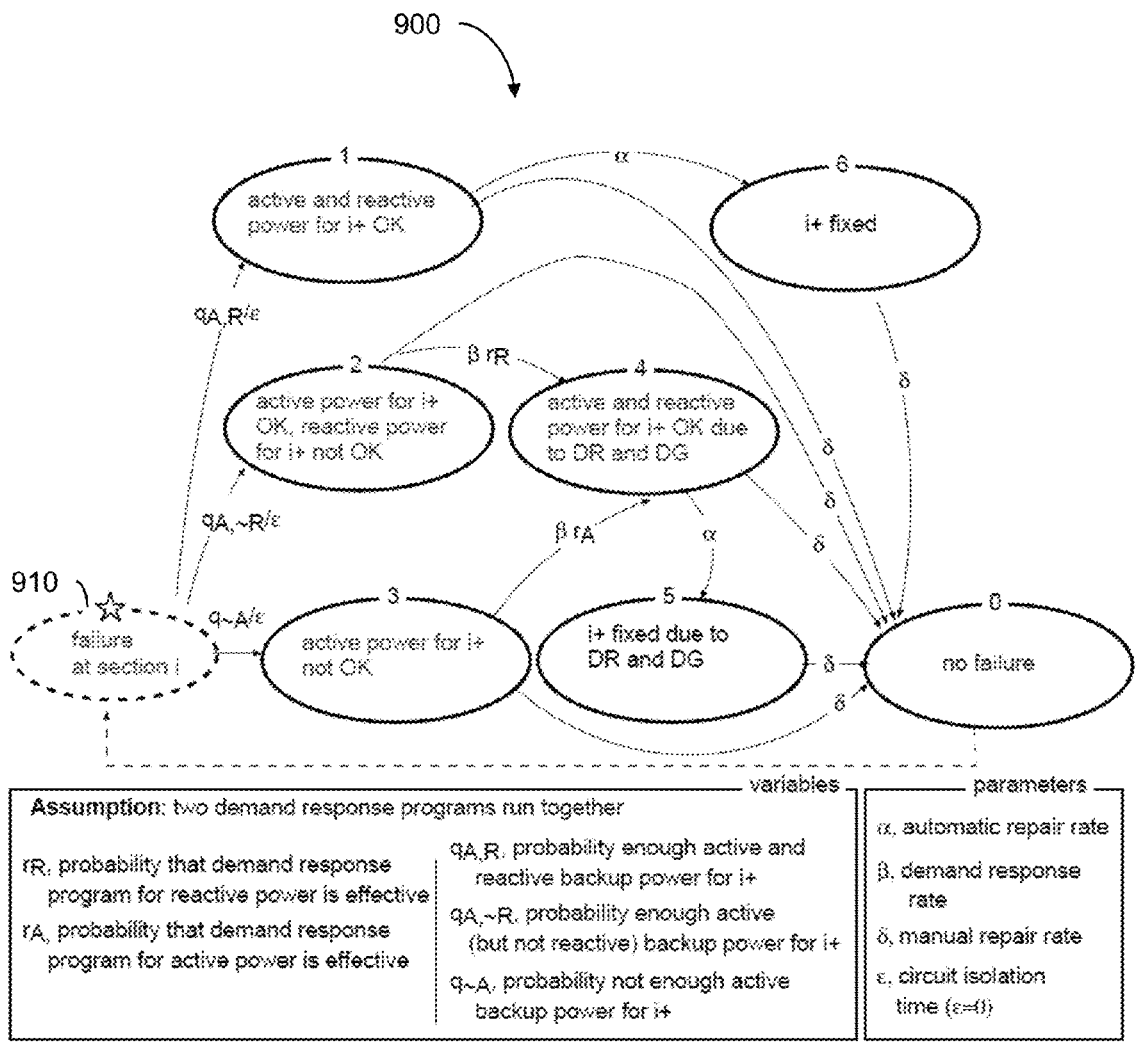
FIG. 9 illustrates a phased recovery model in accordance with one embodiment of the invention.

Next are described a survivability model and metrics that are used as part of the methodology for power grid optimization disclosed below. The survivability model 900, shown in FIG. 9, is a phased-recovery model, wherein the system goes through stages. The initial state 910 is a failure state. Then, based on manual and automated interventions, the system goes through different steps up to reaching full recovery at state 0. The approach is very general, and can be coupled to any phased recovery model.

The initial state 910 of the phased recovery model 900 is a failure state. Recall that the power distribution network is split into sections. After section i is isolated, which occurs after mean time $\epsilon$, the system goes to one of three states, depending on whether there is enough active and reactive backup power to supply energy for the sections that were indirectly affected by the failure. Such sections are referred to as the upstream sections of section i, and also denoted as i+. Because the mean time to isolate a section is much smaller than the other model parameters, it is assumed that $\epsilon=0$.

In states 1 and 2, as shown in FIG. 9, there is enough active power to supply for the upstream sections, whereas in state 3 the backup active power does not suffice. In addition, in state 1, the reactive power also suffices to supply for the upstream sections. Therefore, if the system transitions to state 1, it is amenable to automatic recovery, which occurs with rate $\alpha=2$ min$^{-1}$. In that case, the system transitions to state 6. Otherwise, the demand response application needs to be activated in order to reduce the load in the upstream sections. The demand response application takes mean time $$\frac{1}{\beta} = 15 \text{ min}$$

to be activated, and is effective to reduce the active and reactive loads with probabilities $r_A$ and $r_R$, respectively. In case the demand response application effectively reduces the load, the system transitions to state 4 and is amenable to automatic recovery. In all other states the system is amenable to manual repair, which takes mean time $$\frac{1}{\delta} = 0.25 \text{ h}.$$

Note that automated and manual recovery compete with each other. The manual recovery will always occur, as it is assumed that a truck is needed to fix the failed section, but the automated recovery will usually occur before the manual recovery is finalized. After full recovery, the system transitions to the recovered state 0.

Let $q_{A,R}$, $q_{A,\sim R}$, and $q_{\sim A}$ be the probabilities that the system transitions to states 1, 2 and 3, respectively, after a failure. Those probabilities play a key role in presently described methodology, and depend on the circuit topology, on the amount of investment in distributed generation and on the load.

With each state $s_j$, $j=1, 2, \ldots, 6$, its corresponding rate reward j is associated. As used herein, the rate reward associated with state j characterizes the energy not supplied at that state per time unit. Solving the Markov chain model, survivability related metrics such as the AENS in kWh can be computed. Given the survivability related metrics, new recommendations may be issued on how to invest the remaining budget, the survivability re-computed, and the cycle repeated until reaching the desired levels of AENS.

Note that recovery upon an error/failure heavily depends on the ability to correctly estimate the system state at the time of error detection. In this disclosure, it is assumed that the system state is fully observable. If the measurement data used for the state estimation are unavailable due to communication problems, or corrupted or tampered with (e.g., by a malicious attacker), the mean time to isolate a section may be non-negligible. In such a scenario, the phased recovery model needs to be extended, for instance, to account for the probability that communication is not available after a failure occurs. In the present disclosure, it is assumed that the phased-recovery from a failure can be modeled as a homogeneous continuous time Markov chain.

V. PARAMETERIZATION OF THE SURVIVABILITY MODEL

The present analysis is conditioned on the failure of a given section. As mentioned above, a worst case scenario is considered, wherein the section that fails is the section closest to the main substation. Then, once a failure occurs, the topology of the power grid changes, as the faulty section is isolated and its upstream sections are connected to a backup substation. Given the modified topology, the power flow algorithm is run. For a given load, the algorithm yields the voltage magnitude and voltage angle at each of the sections. Those metrics are computed for multiple values of load, which correspond to variations of demand over the day.

The inputs to the parameterization thus are:

1) load data; e.g., a 24 hour load profile at 15-minute intervals (i.e., 96 load points);

2) a model of the power circuit topology after the failure and after fault isolation; and 3) for each load point, the voltage and angle at each section, obtained from the power flow model.

Recall that the key input parameters of the survivability model are (1) the probabilities that the backup and distributed generation sources suffice to supply active and reactive energy for the sections that are affected by a failure, $q_{A,R}$, $q_{A,\sim R}$, and $q_{\sim A}$; (2) the probabilities that demand response is effective, $r_A$ and $r_R$, and (3) the reward rates at each of the model states. The methodology to obtain those three sets of parameters is described in the following sections A, B, and C, respectively, and is a function of the load data and violation matrices that are described next.

An important ingredient of the model is a time series characterizing how load varies for different times of the day over different sections. In the remainder of this disclosure, it is assumed that the day is divided into 15 minutes time slots. Each slot of 15 minutes is referred to as a given time of the day or load point. The active power load at section i and load point j is then denoted $l_{i,j}^a$, the reactive power load is denoted $l_{i,j}^r$. The overall load is thus characterized as two matrices $L_a=l_{i,j}^a \in \mathbb{R}^{k \times t}$ in kW and $L=l_{i,j}^r \in \mathbb{R}^{k \times t}$ in kVar, where k is the number of sections in the circuit and t is the number of load points used to parameterize the survivability model.

The violation matrices $M_{\sim A}$, $M_{A,\sim R}$ and $M_{A,R}$ are determined by solving the power flow model. They characterize the chances that active and reactive power will suffice to provide for the upstream sections i+ after the failure of a Lagged section i. A violation matrix is a matrix $M \in \{0,1\}^{k \times t}$.

The following describes how to compute $M_{\sim A}$. Each entry of $M_{\sim A}$ characterizes the chances of there being a violation of active power at a given section at a given instant of the day, after the failure of a tagged section. The element in line i and column j of the violation matrix $M_{\sim A}$ is defined as a function of the output of the power flow algorithm as follows:

$$a_{i,j} = \begin{cases} 1, & \text{if there is a violation of active power} \\ 0, & \text{otherwise.} \end{cases}$$

A violation of active power is said to occur when the angle is out of limits +/−10% at section i and at time t. Matrix $M_{A,-R}$, where each entry characterizes the chance of there being a violation of reactive power at a given section at a given instant of the day while active power has no violation, and matrix $M_{A,R}$, where each entry characterizes there being no violation, can both be defined and computed similarly.

A. Parameterization of Sufficiency of Backup Power

In the present disclosure, it is assumed that the fraction of sections and load points for which the violation matrix entry is equal to 1 is a surrogate for the probability that there will be a disruption in the network.

Then, the average of the elements of the violation matrix $M_{\sim A}$ is the probability that backup active power does not suffice to supply for the upstream sections:

$$q_{\sim A} = \sum_{i=1}^{t} \sum_{j=1}^{k} \frac{a_{i,j}}{(k \cdot t)}.$$

$q_{A,R}$ and $q_{A,-R}$ can be similarly defined and computed as functions of $M_{A,R}$ and $M_{A,-R}$, respectively.

B. Parameterization of Effectiveness of Demand Response

To compute the probabilities $r_A$ and $r_R$ that demand response is effective to cope with a lack of active and reactive power, respectively, the load is reduced by the amount of load amenable to demand response. The loads amenable to demand response in section i at load point j are denoted by $d_{i,j}^a$ in kW for the active load and $d_{i,j}^r$ in kVar for reactive load. Let $D_a$ and $D_r$ denote the resulting matrices in $\mathbb{R}^{k \times t}$. Then the new load after demand response has been called for is denoted by $L'_a = L_a - D_a$ for active load and $L'_r = L_r - D_r$ for reactive load. For those new load data, the power flow is solved again and new violation matrices $M'_{\sim A}$, $M'_{A,-R}$ and $M'_{A,R}$ are obtained.

For determining whether demand response has improved the stability of the circuit, the technique first considers the number of load points and sections for which the original load (without demand response) is large enough to cause the voltage or angle to be beyond desired bounds. That number is given by $\mathcal{A} = \sum_{0 \leq i \leq k} \sum_{0 \leq j \leq k} a_{i,j}$ for $a_{i,j} \in M_{\sim A}$ for active power and by $\mp$ accordingly for $M_{A,-R}$ for reactive power. After calling for demand response, the number of load points and sections that still have violations is obtained; i.e., $\mathcal{A}'$ for $M'_{\sim A}$ for active power and $\mp'$ for $M'_{A,-R}$ for reactive power.

The effectiveness of demand response is the ratio of the number of scenarios for which the circuit is unstable after reducing the load when demand response is called for, divided by the total number of scenarios at which the circuit was unstable in the first place:

$$r_A = 1 - \mathcal{A}'/\mathcal{A}, \quad r_R = 1 - \mp'/\mp.$$

C. Parameterization of Reward Rates

The reward rates at each of the model states are obtained from the load data and the state of the individual sections. Referring to FIG. 9, the average energy supplied (AES) in states 1-3 is zero and the AENS equals the sum of the active power load of all sections. In state 4, the AENS decreases by the amount of load amenable to demand response. In state 5, all upstream sections i+ have been recovered while the demand response program is active, so the AES is the active power load of sections i+ reduced by the amount of load amenable to demand response and the AENS is the active power load of section i. In state 6, all upstream sections have been recovered by the backup substation and the full energy is supplied, so the AES is the active power load of sections i+ and the AENS is the active power load of section i. Finally, in state 0 the main substation has been recovered as well, so that AES is the sum of the load of all sections and AENS is zero.

Note that the AES and AENS metrics measure the active power supplied or not supplied, but not reactive power. That is because active power is billed to the customer. The loss of revenue in case of failure is therefore based on the active energy not supplied. Even though providing reactive power, by itself, is not a survivability metric, reactive power is taken into account in the survivability model. Without reactive power, the circuit will be unstable and no active power will be supplied.

VI. EVALUATION

In this section, the approach is applied to a realistic case study system. Section A describes the case study system and the parameterization of the survivability model for this case study. Section B presents the evaluation results, and Section C discusses the findings.

A. Case Study Setup

The case study system, shown in FIG. 8, is based on a simple distribution automation network which has been suggested as a distribution automation benchmark and which is derived from a German medium voltage distribution network. The network supplies a small town and the surrounding rural area. To cover more investment options, the benchmark network is duplicated (sections 2-12 are a copy of sections A-K; section 1 is another copy of section A with reduced load) and the two networks are connected with a tie switch 820 that closes in case of failure.

Worst-case scenario analysis is usually used in risk management of critical infrastructures. Thus, in the present work, the worst case failure is assumed in this circuit, which is the failure 805 in section 1 as shown in FIG. 2. That failure initially causes the left circuit to be unpowered. Then, the recloser 815 can be opened to isolate the failure, and the tie switch 820 can be closed to power sections 2 to 12 from the backup substation 825. The power flow analyses will show in which cases the resulting circuit would be stable; i.e. the system can quickly recover by using distribution automation.

Representative profile characteristics are based on real-world conditions: the load profiles used in this case study were taken from the association of the electrical energy industry in Germany (BDEW), the generation profiles were taken from EnBW (Germany), and the wind profile used here was taken from E.on Netz (Germany). The data represents average values for the load and generation over the course of a day. The total active and reactive loads, averaged over the 96 load points, is equal to 13,906.00 KW and 4,570.80 KVar, respectively. It is furthermore assumed that 10% of the load in each section is amenable to demand response mechanisms in this system.

Parameterizing the Survivability Model: For each candidate circuit, the power flow model is solved to parameterize the survivability model. The transition probabilities and the reward rates of the survivability model are determined based on the power flow results as described in the Section V. As an example, the reward rates for the initial circuit candidate, which are derived from the initial load data, are shown in Table AII.

TABLE AII

REWARD RATES FOR INITIAL CIRCUIT CANDIDATE $c_0$: ENERGY SUPPLIED PER HOUR (ES/H) AND ENERGY NOT SUPPLIED PER HOUR (ENS/H) IN KW OR KVAR.

| state | 1-3 | 4 | 5 | 6 | 0 |
|---|---|---|---|---|---|
| Active AES/h | 6648 | 6648 | 12683 | 13354 | 13906 |
| Active AENS/h | 7259 | 6533 | 497 | 552 | 0 |
| Reactive AES/h | 2185 | 2185 | 4169 | 4389 | 4571 |
| Reactive AENS/h | 2386 | 2147 | 163 | 182 | 0 |

The reward rates of states 0-3 and 6 are constant over the course of the optimization, while the reward rates of states 4 and 5 are determined anew for each circuit candidate because the load data may vary due to demand response investments (see Section V-C). Based on the selected demand response investments per section, the AENS is reduced by the amount of power that is susceptible to demand response.

Investment Options and Constraints: A set of investment options is considered as summarized in Table AI, Section III-D. All active power investments also generate reactive power. Reactive power generation is calculated based on the German code for distributed generators by BDEW. Reactive power investments (i.e., DStatcom) only add reactive power to the system.

To reflect additional constraints on investment options, the number of selections of identical options is limited to one. Per section, only one generator per type can be added; e.g., one DStatcom. Globally, only three investment options of the same type can be used. These constraints reflect additional considerations and rules of thumb of power engineers not captured in the survivability model, such as the tolerance of the residents in an area. Additional constraints formulated by power engineers can be included easily in the algorithm. Additionally, the costs constraint in this case study is set to 2 million.

Optimization Heuristics: Results are presented based on four optimization algorithms using different heuristics for selecting investments. The basic algorithm underlying all algorithms has been shown in FIG. 7.

All algorithms select the power type to provide and the section in which to invest in the same way. The type of power to add is selected based on the violation matrices of the power flow results (cf. Section V). If more voltage violations are observed, investments for reactive power should be chosen. If more angle violations are observed, investments for active power should be chosen. Furthermore, the algorithm decides in which section to invest based on the number of voltage or angle violations in the power flow. The section with most violations is selected. If there is a tie, one of the sections with maximum number of violations is randomly selected.

TABLE AIII

STATISTICS OF THE OPTIMIZATION ALGORITHM RUNS

| Variant | Number of evaluated candidate models | Duration in min |
|---|---|---|
| Greedy/Efficient | 65 | 24 |
| Greedy/Cheapest | 118 | 46 |
| Greedy/Powerful | 27 | 10 |
| Steepest-Ascent | 85 | 27 |

The four algorithms differ in the approach used to select the type of investment to place in the selected section. Three heuristics were formulated to reflect investment strategies in the real world. The first strategy is to invest in the cheapest available investment options to keep costs low and advance in small steps. The second strategy is to invest in the most efficient investment option in terms of the ratio of provided power in kW or kVAr to the cost of the selected option. The third strategy is to always invest in the most powerful option available in terms of provided power in kW or kVAr. That strategy is often similar to the most efficient strategy, as more powerful generators tend to be more efficient due to economies of scale (cf. Section III-D).

Also developed was a steepest-ascent approach, which combines the three heuristics. In each iteration of the optimization, each of the three heuristics presented above for a suggested next investment option is evaluated and the option with the highest improvement (if any) is selected.

Table AII presents the statistics obtained by executing the four optimization algorithms run on an IBM Thinkpad with two Intel Core 2 CPUs at 2 GHz. The "powerful" variant is fastest because it has the lowest number of power flow and survivability evaluations. The "cheapest" variant is the slowest because more evaluations are required when the heuristic uses the cheaper options first.

Empirical testing results have provided insights into the relation of investment and survivability and can thus support human engineers to plan investments for the distribution grid. The candidate circuits obtained by the disclosed algorithms are samples of the solution space. As such, there is no guarantee for the global optimality of the solutions.

The disclosed tool can be used for return on investment computation (survivability/cost). The methodology can also be used in conjunction with a manual approach. Engineers can use the power flow and survivability analysis to assess distribution grid models they manually created based on their design experience. Thus, they can support good practices and rules of thumb by quantitative analysis of expected survivability metrics.

VII. CONCLUSION

Smart grids are fostering a paradigm shift in the realm of power distribution systems. Understanding and analyzing smart grids requires a unified, holistic and computationally efficient approach that takes into consideration the interplay of communication reliability, energy backup, distribution automation topology, energy storage and intelligent features such as automated failure detection, isolation and restoration (FDIR) and demand response.

The present disclosure begins to address this problem by presenting a framework for building a holistic and computationally efficient approach to the survivability analysis of smart distribution power grids. High-level survivability analysis is combined with electric power flow analysis. The approach uses power flow analysis to determine the probabilities that a system is unstable after a failure occurs. The analysis is based on the detailed load and generation data available from grid operators, which contain the demanded power and generated power for each hourly interval over the day. The power flow results are used to parameterize the survivability model and determine the expected average energy not supplied (AENS) after a certain failure occurs.

The proposed methodology is then used to efficiently evaluate a large number of distribution automation network design candidates, as shown in the empirical results section. Sixty-five options were examined for the greedy/efficient variant, 118 options for greedy/cheapest variant, 27 options for the greedy/powerful and 85 options for the steepest ascent variant. Using the presented methodology, engineers can create cost efficient and survivable smart-grid network designs that match the engineering range for best survivability at reasonable investment levels.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

What is claimed is:

1. A method for selecting improvements to an original distributed automation power grid, the method comprising:
    (a) identifying the original distributed automation power grid design as a current circuit;
    (b) by a processor, creating a parameterized phased-recovery survivability model of the current circuit with a selected failure event by performing a power flow analysis using a time series of load values of each of a plurality of sections in the grid at each of a plurality of times of day;
    (c) by the processor, determining an average energy not supplied metric of the current circuit with the selected failure event, using the parameterized phased-recovery survivability model of the current circuit;
    (d) generating a candidate circuit containing a modification to the current circuit;
    (e) by the processor, creating a parameterized phased-recovery survivability model of the candidate circuit with the selected failure event by performing a power flow analysis using a time series of load values of each of a plurality of sections in the grid at each of a plurality of times of day;
    (f) by the processor, determining an average energy not supplied metric of the candidate circuit with the selected failure event, using the phased-recovery survivability model of the candidate circuit;
    (g) substituting the candidate circuit as the current circuit only if the average energy not supplied metric of the candidate circuit is better than the average energy not supplied metric of the current circuit; and
    (h) repeating the operations (d), (e), (f) and (g) until the average energy not supplied metric of the current circuit meets a survivability requirement for the grid.

2. A method as in claim 1, further comprising:
    ceasing the repeating of operations (d), (e), (f) and (g) before the survivability requirement for the grid is met when the candidate circuit exceeds a budget for improvement costs.

3. A method as in claim 1, further comprising:
    ceasing the repeating of operations (d), (e), (f) and (g) before the survivability requirement for the grid is met when a maximum number of iterations is reached.

4. A method as in claim 1, wherein creating a parameterized phased-recovery survivability model of the current circuit further comprises:
    computing violation matrices reflective of violations of active and reactive power requirements, wherein each element of the violation matrices indicates whether one of the plurality of sections violates power requirements at one of the plurality of times of day.

5. A method as in claim 4, wherein generating a candidate circuit containing a modification to the current circuit further comprises:
    choosing between adding an active and a reactive power source based on a comparison of a number of active power violations with a number of reactive power violations.

6. A method as in claim 1, wherein generating a candidate circuit containing a modification to the current circuit further comprises:
    selecting a modification using a greedy algorithm designed to choose a most efficient power source having a greatest power per unit cost.

7. A method as in claim 1, wherein generating a candidate circuit containing a modification to the current circuit further comprises:
    selecting a modification using a greedy algorithm designed to choose a lowest cost power source.

8. A method as in claim 1, wherein generating a candidate circuit containing a modification to the current circuit further comprises:
    selecting a modification using a greedy algorithm designed to choose a most powerful power source in terms of provided power.

9. A method as in claim 1, wherein generating a candidate circuit containing a modification to the current circuit further comprises:
    selecting a modification using a steepest-ascent greedy algorithm designed to maximize improvement based on greatest provided power, lowest cost and greatest efficiency.

10. A method as in claim 1, wherein generating a candidate circuit containing a modification to the current circuit further comprises:
    selecting equipment to add to the current circuit; and
    selecting one of the plurality of sections wherein to place the equipment.

11. A non-transitory computer-usable medium having computer readable instructions stored thereon that, when executed by a processor, cause the processor to perform operations for selecting improvements to an original distributed automation power grid, the operations comprising:
    (a) identifying the original distributed automation power grid design as a current circuit;
    (b) by a processor, creating a parameterized phased-recovery survivability model of the current circuit with a selected failure event by performing a power flow analysis using a time series of load values of each of a plurality of sections in the grid at each of a plurality of times of day;
    (c) by the processor, determining an average energy not supplied metric of the current circuit with the selected failure event, using the parameterized phased-recovery survivability model of the current circuit;

(d) generating a candidate circuit containing a modification to the current circuit;

(e) by the processor, creating a parameterized phased-recovery survivability model of the candidate circuit with the selected failure event by performing a power flow analysis using a time series of load values of each of a plurality of sections in the grid at each of a plurality of times of day;

(f) by the processor, determining an average energy not supplied metric of the candidate circuit with the selected failure event, using the phased-recovery survivability model of the candidate circuit;

(g) substituting the candidate circuit as the current circuit only if the average energy not supplied metric of the candidate circuit is better than the average energy not supplied metric of the current circuit; and (h) repeating the operations (d), (e), (f) and (g) until the average energy not supplied metric of the current circuit meets a survivability requirement for the grid.

12. A non-transitory computer-usable medium as in claim 11, wherein the operations further comprise:
ceasing the repeating of operations (d), (e), (f) and (g) before the survivability requirement for the grid is met when the candidate circuit exceeds a budget for improvement costs.

13. A non-transitory computer-usable medium as in claim 11, wherein the operations further comprise:
ceasing the repeating of operations (d), (e), (f) and (g) before the survivability requirement for the grid is met when a maximum number of iterations is reached.

14. A non-transitory computer-usable medium as in claim 11, wherein creating a parameterized phased-recovery survivability model of the current circuit further comprises:
computing violation matrices reflective of violations of active and reactive power requirements, wherein each element of the violation matrices indicates whether one of the plurality of sections violates power requirements at one of the plurality of times of day.

15. A non-transitory computer-usable medium as in claim 14, wherein generating a candidate circuit containing a modification to the current circuit further comprises:
choosing between adding an active and a reactive power source based on a comparison of a number of active power violations with a number of reactive power violations.

16. A non-transitory computer-usable medium as in claim 11, wherein generating a candidate circuit containing a modification to the current circuit further comprises:
selecting a modification using a greedy algorithm designed to choose a most efficient power source having a greatest power per unit cost.

17. A non-transitory computer-usable medium as in claim 11, wherein generating a candidate circuit containing a modification to the current circuit further comprises:
selecting a modification using a greedy algorithm designed to choose a lowest cost power source.

18. A non-transitory computer-usable medium as in claim 11, wherein generating a candidate circuit containing a modification to the current circuit further comprises:
selecting a modification using a greedy algorithm designed to choose a most powerful power source in terms of provided power.

19. A non-transitory computer-usable medium as in claim 11, wherein generating a candidate circuit containing a modification to the current circuit further comprises:
selecting a modification using a steepest-ascent greedy algorithm designed to maximize improvement based on greatest provided power, lowest cost and greatest efficiency.

20. A non-transitory computer-usable medium as in claim 11, wherein generating a candidate circuit containing a modification to the current circuit further comprises:
selecting equipment to add to the current circuit; and
selecting one of the plurality of sections wherein to place the equipment.

* * * * *